United States Patent [19]

Pfeiffer

[11] Patent Number: 4,611,854

[45] Date of Patent: Sep. 16, 1986

[54] SELF-STANDING SEAT BUCKLE MOUNT FOR AUTOMOTIVE VEHICLES

[75] Inventor: Robert C. Pfeiffer, Sterling Heights, Mich.

[73] Assignee: Allied Corporation, Morris Township, Morris County, N.J.

[21] Appl. No.: 652,781

[22] Filed: Sep. 20, 1984

[51] Int. Cl.$^4$ .............................................. A62B 35/00
[52] U.S. Cl. .................................... 297/468; 280/801; 297/482
[58] Field of Search ................. 280/801; 297/468, 469, 297/481, 482

[56] References Cited

U.S. PATENT DOCUMENTS

| | | | |
|---|---|---|---|
| 3,219,361 | 11/1965 | Brown | 280/801 |
| 3,258,293 | 6/1966 | Sharp | 297/483 |
| 3,287,063 | 11/1966 | Nicholas | 297/475 |
| 3,295,862 | 1/1967 | Ebert | 280/807 |
| 3,572,832 | 3/1971 | Graham | 297/475 |
| 3,712,401 | 1/1973 | Rothschild | 180/270 |
| 4,118,068 | 10/1978 | Fohl | 297/481 |
| 4,312,539 | 1/1982 | Takada | 297/468 |
| 4,332,500 | 6/1982 | Smith, Jr. | 403/114 |
| 4,451,087 | 5/1984 | Tamamushi | 297/468 |

FOREIGN PATENT DOCUMENTS

| | | | |
|---|---|---|---|
| 2354108 | 4/1975 | Fed. Rep. of Germany | 280/801 |
| 2656121 | 6/1977 | Fed. Rep. of Germany | 297/468 |
| 2749524 | 5/1978 | Fed. Rep. of Germany | 297/468 |
| 82/03017 | 9/1982 | PCT Int'l Appl. | 297/468 |
| 1080956 | 8/1967 | United Kingdom | 297/468 |

Primary Examiner—James T. McCall
Attorney, Agent, or Firm—Russel C. Wells; Markell Seitzman

[57] ABSTRACT

A self-standing seat belt buckle mount for automotive vehicles having an elongated semi-rigid member supporting at one end a seat belt buckle. The other end of the semi-rigid member is pivotally attached to a mounting bracket. Disposed between the semi-rigid member and the mounting bracket is a spring clutch providing a friction force adjustably retaining the semi-rigid member in any position between its pivotal limits. The spring clutch comprises a clutch plate attached to either the semi-rigid member and the mounting bracket and a washer type spring compressively disposed between the clutch plate and the other of said semi-rigid member or mounting bracket.

32 Claims, 18 Drawing Figures

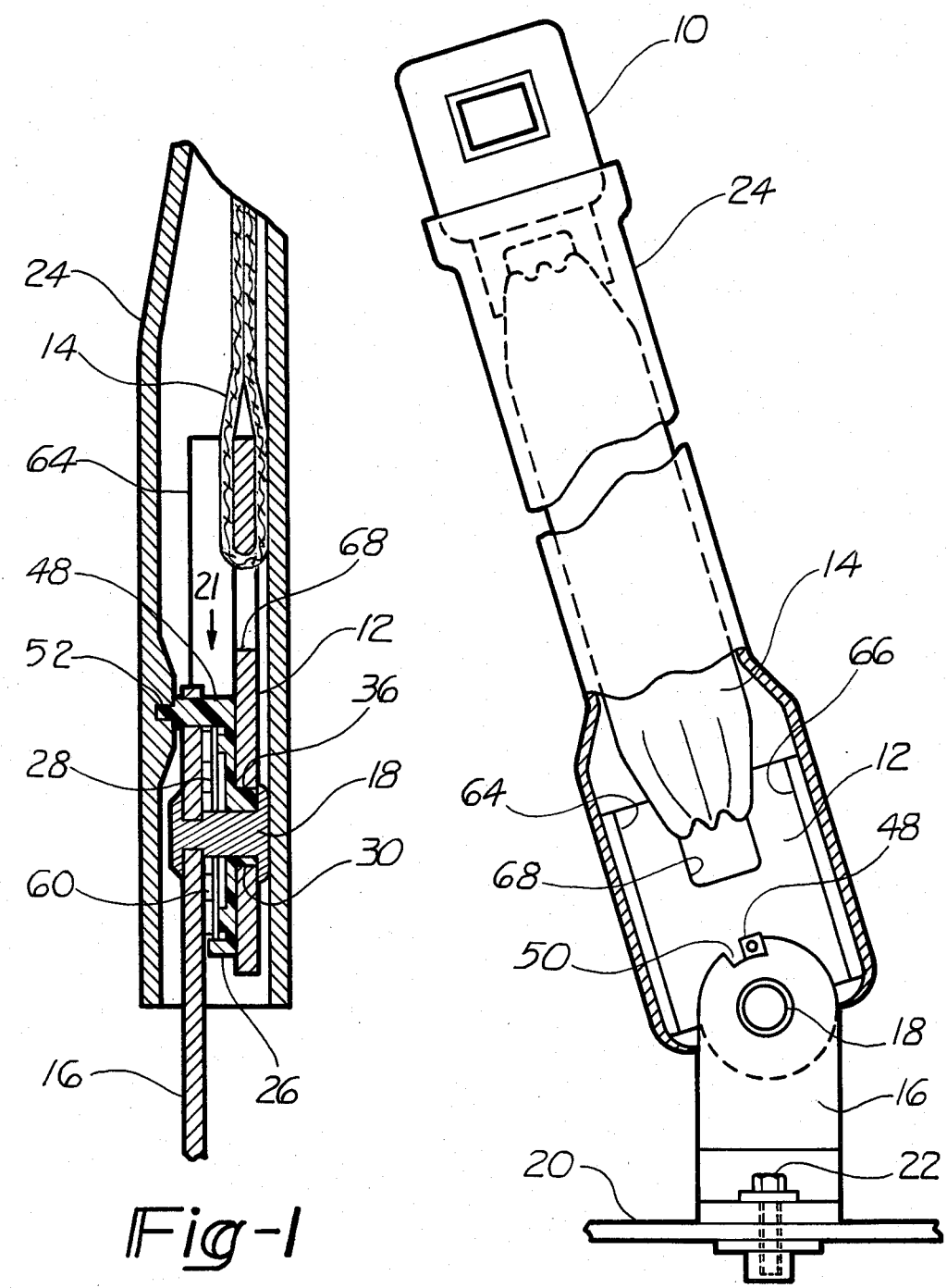

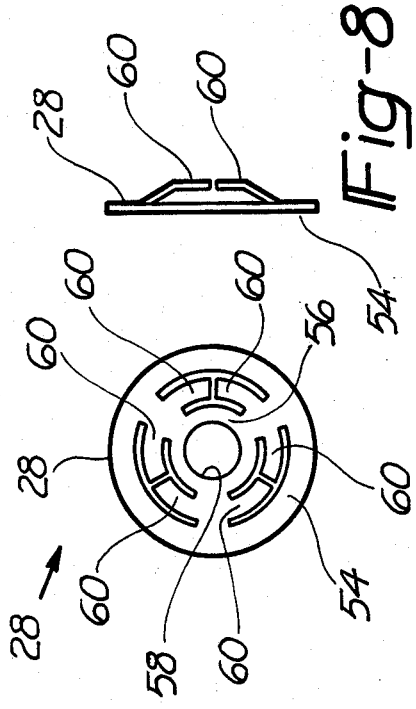
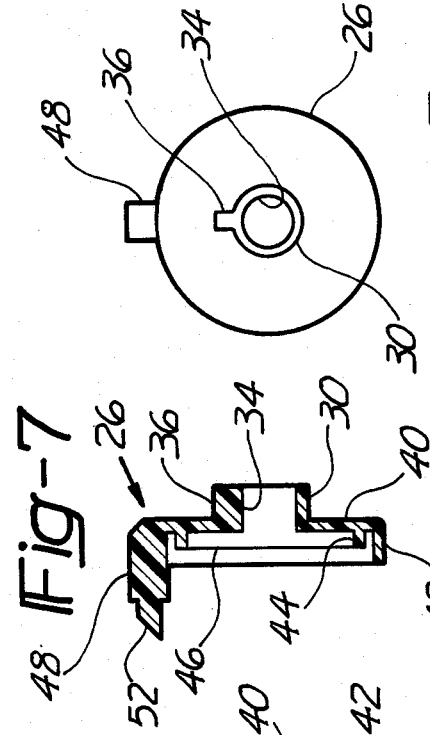
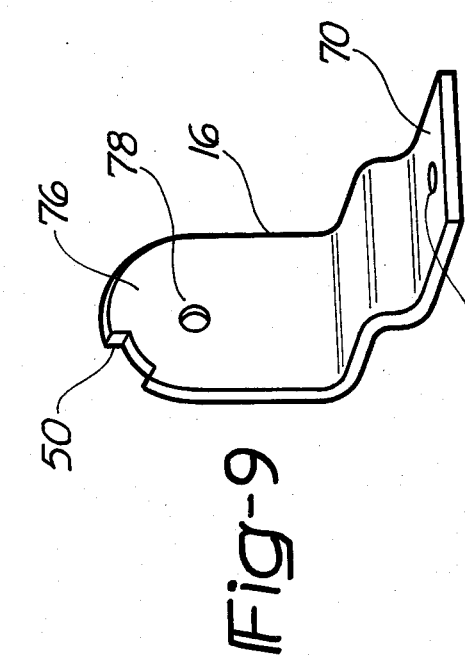
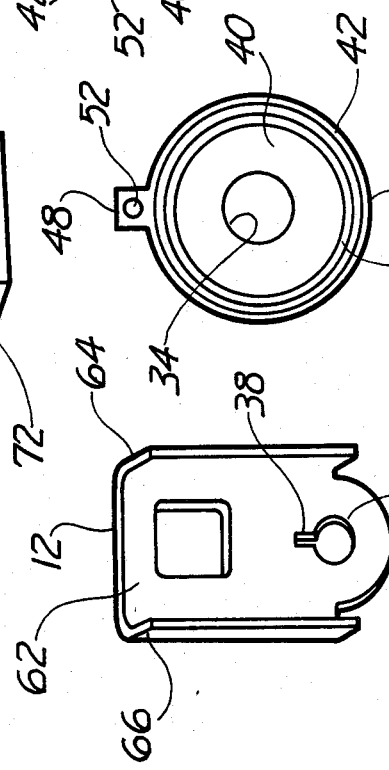

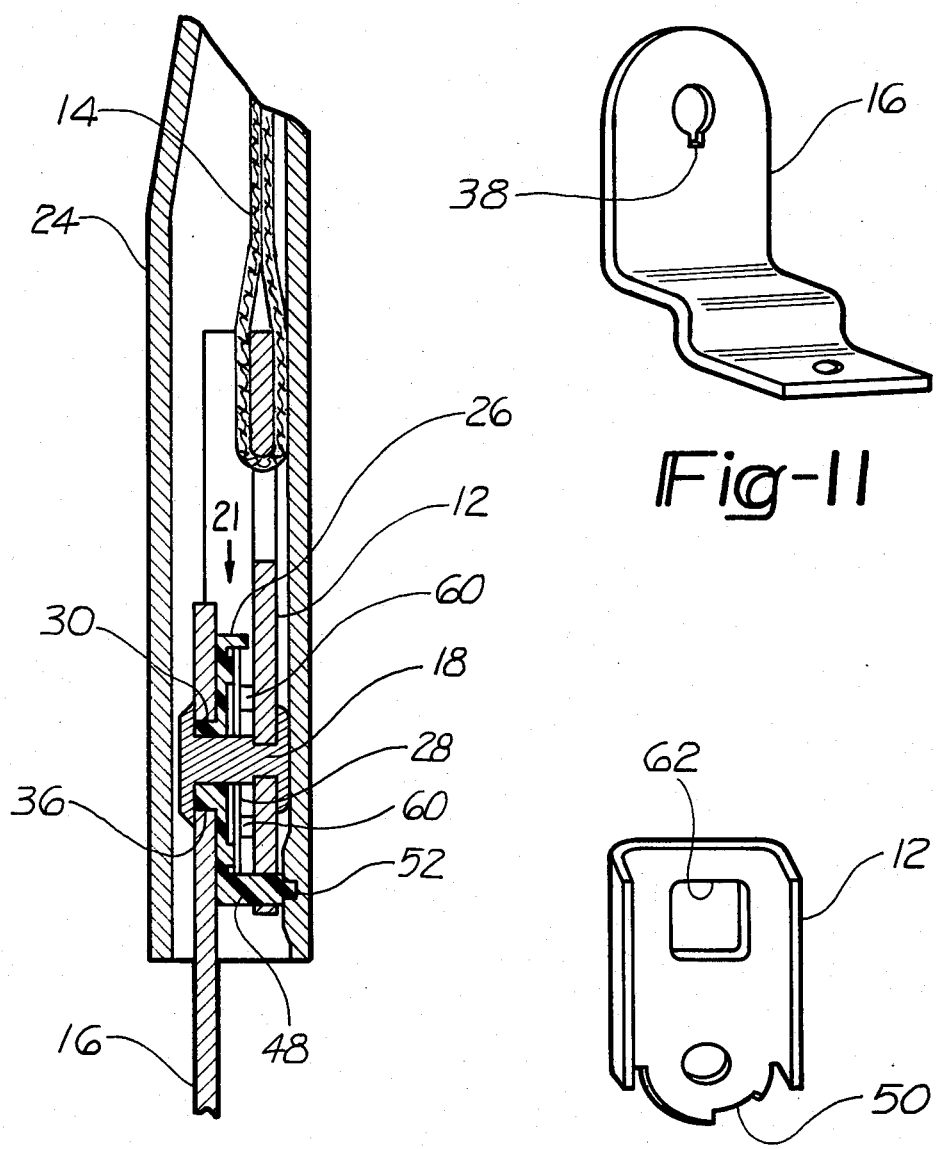

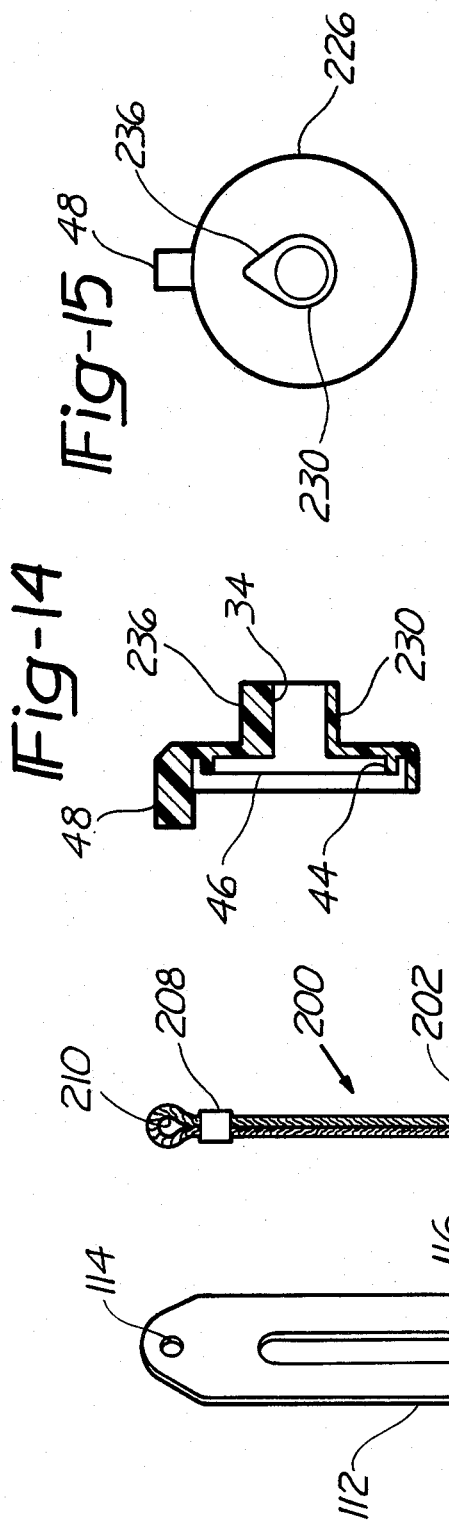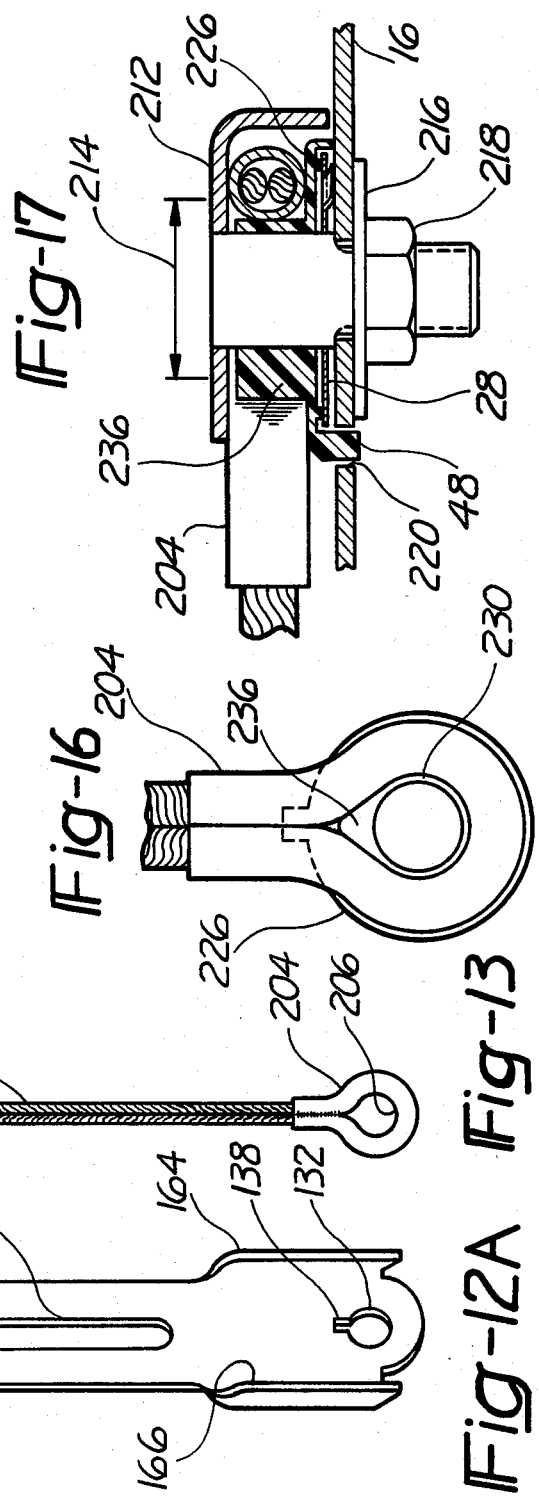

SELF-STANDING SEAT BUCKLE MOUNT FOR AUTOMOTIVE VEHICLES

BACKGROUND OF THE INVENTION

1. Field of the Invention

The invention is related to automotive safety restraint systems and in particular to an adjustable self-standing seat belt buckle mount.

2. Prior Art

In the front seat of automotive vehicles with bucket type seats, the inboard seat belt buckle end is traditionally mounted and held essentially in a rigid up-standing position. When the seat has a considerable fore and aft range of adjustment, the routing of the lap belt over the occupant is compromised. Carried to the extreme, the resultant restraint capabilities are less than desirable. With the seat in its rearmost position, the lap portion of the seat belt could lay across the occupant's thighs. Therefore in a crash condition, the occupant is allowed to slide forward before the seat belt webbing becomes taut placing the occupant closer to interior elements of the vehicle during peak crash forces with higher than necessary loads imposed on the occupant due to natural belt system elongation. With the seat in its forwardmost position, the lap web may ride up into the viscera area which is a poor location to absorb the crash forces.

Various types of self-standing seat belt buckle mounts are known in the art. Ebert in U.S. Pat. No. 3,295,862 and Sharp in U.S. Pat. No. 3,258,293 disclose seat belt buckle mounts rigidly attached to floor mounts. These mounts are unsatisfactory because the position of the mount changes with changes in the position of the seat. Alternatively Graham in U.S. Pat. No. 3,572,832 discloses a spring loaded buckle mount attached to the seat which is returned to the vertical position when the seat belt is unbuckled. This arrangement places the crash load on the seat itself requiring an increase in the structural rigidity of the seat mounting to withstand crash loads. Rothschild in U.S. Pat. No. 3,712,401 discloses a self-standing electromagnetically actuated seat belt system having an angled housing attached to the vehicle's seat. Fohl in U.S. Pat. No. 4,118,068 discloses an adjustable self-standing seat belt buckle mount attached to a structural member of the vehicle, which like the buckle mount disclosed by Graham is spring loaded to return it to an upright position when the seat belt is unbuckled. Tamamushi in U.S. Pat. No. 4,451,087 discloses an adjustable self-standing buckle mount having a guide member and a bushing member interposed between a semi-rigid upstanding member and a rigid support member attached to the vehicle's seat. A spring washer external to the upstanding member provides a frictional force permitting the upstanding member to be retained at a convenient position for use.

SUMMARY OF THE INVENTION

The invention is an adjustable self-standing seat belt buckle mount for an automotive safety restraint system of the type having a seat belt buckle mounted to one end of a semi-rigid member, a mounting bracket attached to a structural member of the vehicle, and a pivot member pivotally connecting the other end of the semi-rigid member to the mounting bracket the improvement characterized by a spring clutch disposed between said mounting bracket and the other end of the semi-rigid member providing a frictional force sufficient to retain the semi-rigid member in its pivoted position. The spring clutch comprises a clutch plate connected to the semi-rigid member coaxial with the pivot member and a spring member disposed between the clutch plate and the mounting bracket. One advantage of the upstanding buckle mount is that the spring clutch retains the semi-rigid member in its unsupported position after the seat belt is unbuckled. Another advantage is that the buckle mount can be pivoted to accommodate fore and aft adjustment of the seat and occupants of different stature.

BRIEF DESCRIPTION OF THE FIGURES

FIG. 1 is a side view of the self-standing seat belt buckle mount.

FIG. 2 is a cross-sectional rear view of the self-standing seat belt buckle mount.

FIG. 3 is a side view of the clutch plate.

FIG. 4 is a cross-sectional rear view of the clutch plate.

FIG. 5 is a reverse view of the clutch plate.

FIG. 6 is a perspective of the anchor plate.

FIG. 7 is a side view of the spring member.

FIG. 8 is a edge view of the spring member.

FIG. 9 is a perspective of the mounting bracket.

FIG. 10 is an alternate embodiment of the self-standing seat belt buckle mount.

FIG. 11 is a perspective of the anchor plate used in the alternate embodiment.

FIG. 12 shows an alternate embodiment of the semi-rigid member comprising an elongated anchor plate.

FIG. 12A shows an alternate embodiment of the semi-rigid member comprising an elongated anchor plate.

FIG. 13 shows an alternate embodiment of the semi-rigid member comprising a steel cable assembly.

FIGS. 14 and 15 show a clutch plate modified to receive the steel cable assembly.

FIG. 16 shows the assembly of the steel cable assembly to the modified clutch plate.

FIG. 17 is a partial cross section showing the assembly details of the self-standing seat belt buckle mount embodying the cable assembly as the semi-rigid member.

DETAILED DESCRIPTION OF THE INVENTION

The self-standing buckle mount is shown on FIGS. 1 and 2. Referring to FIG. 1, a conventional seat belt buckle 10 is connected to an anchor plate 12 by means of a loop of webbing 14 or any similar flexible member as is known in the art. The anchor plate 12 is pivotally mounted to a mounting bracket 16 by means of a shouldered rivet 18. The mounting bracket 16 is preferably secured to the floor 20 of the vehicle adjacent to the seat associated with the seat belt by means of a bolt 22 in a conventional way as is known in the art. Alternatively the mounting bracket 16 may be a vertical structural member of the vehicle's seat as is known in the art. A semi-rigid plastic sleeve 24 structurally supports the buckle 10 above the anchor plate 12.

Interposed between the anchor plate 12 and mounting bracket 16 is a spring clutch 21 comprising a molded stuctural plastic clutch plate 26 and washer type clutch spring 28 as shown in FIG. 2. Referring to FIGS. 2 through 6 the molded plastic clutch plate 26 has a cylindrical collar 30 which is received in a collar aperture 32 provided through the anchor plate 12. A circular bore 34 provided through the cylindrical collar 30 receives shouldered rivet 18. The cylindrical collar serves as a bearing pivotally supporting the anchor plate 12 about the shouldered rivet 18. Radially extending from the cylindrical collar 30 is a key 36 which is received in a mating key slot 38 provided in the anchor plate 12 as shown in FIG. 6. The key 36 rotationally locks the clutch plate 26 to the anchor plate 12 so that the clutch plate 26 will rotate with rotation of the anchor plate about the shouldered rivet 18.

The clutch plate 26 also has a flange portion 40 radially supporting a peripheral rim 42 and a cylindrical rib 44 concentric with bore 34. The peripheral rim 42 and cylindrical rib 44 are formed integral with the flange portion 40. The end of the cylindrical rib 44 opposite the flange 40 defines a flat clutch bearing surface 46 internal to the peripheral rim 42. A guide finger 48 is provided at the periphery of radial flange 40 and extends beyond the limits of the peripheral rim 42 on the side opposite the collar 30. The guide finger 48 is received in an arcuate slot 50 in the mounting bracket 16 which limits the rotational extremities of the clutch plate 26 and anchor plate 12. A lock pin 52 provided at the end of the guide finger 48 is received in a mating bore 54 provided in the semi-rigid plastic sleeve 24, to longitudinally lock the plastic sleeve relative to the anchor plate 12.

The clutch spring 28, shown in FIGS. 8 and 7, has a substantially flat rim section 54. The external diameter of the clutch spring 28 is smaller than the internal diameter of the clutch plate's peripheral rim 42. The rim section 54 of the clutch spring 28 engages the clutch engagement surface 46 defined by the cylindrical rib 44. The clutch spring 26 also has a flat central section 56 with a pilot aperture 58 provided therethrough. A plurality of leaf-like spring fingers 60 are formed in the clutch spring 28 intermediate rim section 54 and central section 56. In the completed assembly of the spring clutch 21 the spring fingers 60 engage the mating surface of the mounting bracket 16 as shown in FIG. 2 and produce a force urging the rim section 54 of the clutch spring 28 into frictional contact with the spring engagement surface 46 of the clutch plate 26. The spring rate of the clutch spring 28 is selected to produce a frictional force between the rim section 54 of the clutch spring 28 and the spring engagement surface 46 of the clutch plate 28 sufficient to retain the anchor plate 12, buckle 10, and semi-rigid plastic sleeve 24 in any position between the limits defined by the arcuate slot 50 in the floor mounted bracket 16.

The details of the anchor plate 12 are shown in FIG. 6. The anchor plate 12 has a flat plate portion 62 bounded on its lateral sides by a pair of longitudinal support ribs 64 and 66. Provided in the plate portion 62 are the collar aperture 32 and key slot 38 as previously described and a rectangular aperture 68 for receiving the loop of seat belt webbing 14 as shown in FIGS. 1 and 2.

As shown in FIG. 9, the mounting bracket 16 has a horizontal portion 70 having an aperture 72 for receiving mounting bolt 22 and a vertical portion 76 in which is provided an aperture 78 for receiving the shouldered rivet 18 and the arcuate slot 50 as previously described.

In an alternate embodiment, the spring clutch 21 may be reversed as shown in FIG. 10. In this embodiment the collar aperture 32 and key slot 38 are provided in the mounting bracket 16 as shown in FIG. 11 and the arcuate slot 50 and rivet aperture 78 are provided on the anchor plate 12 as shown in FIG. 12. The mating bore which receives the lock pin 52 provided at the end guide finger 48 is provided on the semi-rigid sleeve 24 on the side adjacent to the anchor plate 12 as shown in FIG. 10. The function and operation of the spring clutch 21 is effectively the same as described with reference to the embodiment of FIGS. 1 and 2 and need not be repeated for an understanding of the invention.

FIG. 12A shows an alternate embodiment of the anchor plate 12 designated anchor plate 112. In this embodiment, the anchor plate 112 is elongated and connects directly to the buckle 10 eliminating the loop of webbing 12 shown in the embodiment of FIGS. 1 through 11. The anchor plate 112 has a collar aperture 132 and key slot 138 corresponding to the collar aperture 32 and key slot 38 shown on the embodiment of FIG. 6. An aperture 114 is provided at the end of the anchor plate 112 opposite collar aperture 132 for attachment of the buckle 10 by means of a rivet (not shown) or any other means as is known in the art. One or more slots, such as slot 116, may be provided along the length of anchor plate 112 to reduce its rigidity and permit a limited degree of flexibility transverse to the plane of the anchor plate 112. Alternatively, the section of the anchor plate 112 above the longitudinal ribs 164 and 166 may be made thinner or its width reduced to provide a degree of flexibility.

The anchor plate 12 and loop of webbing 14 of FIGS. 1 through 11 may also be replaced by the semi-rigid cable assembly 200 shown in FIG. 13. Referring to FIG. 13, the semi-rigid cable assembly 200 comprises a loop of a twisted steel cable 202 approximately 3 to 4 millimeters in diameter. The opposite ends of the cable 202 are captivated in a metal ferrule 204 which forms a tear drop shaped aperture 206 corresponding to collar aperture 32 and key slot 38 of anchor bracket 12 shown in FIG. 6. A retainer clip 208 joins the folded portions of the cable 202 at the end opposite the ferrule 204 forming a second eyelet 210. The eyelet 210 corresponds to aperture 114 of the anchor bracket 112 shown in FIG. 12A. The buckle 10 is mounted to the cable assembly 200 by a rivet or similar type fastener passing through eyelet 210.

To accommodate the tear drop shaped aperture 206 of the ferrule 204, the clutch plate is modified as shown in FIGS. 14 and 15. Referring to FIGS. 14 and 15, the modified clutch plate 226 is the same as shown in FIGS. 3-5 except that the cylindrical collar 230 is longer to accommodate the increased thickness of ferrule 204 and the key 236 protruding from the collar 230 is triangular in shape as shown in FIG. 15. The collar 230 and triangular key 236 form a tear drop configuration which conforms to the shape of the tear drop aperture 206 formed by ferrule 204 as shown in FIG. 16.

The assembly of the cable assembly 200 to the spring clutch 21 is shown in FIG. 17. Referring to FIG. 17, the collar 230 and triangular key 236 are captivated by the ferrule 204 of the cable assembly 200 and will rotate therewith. A cup-shaped housing 212 encloses the end of the ferrule 204 and clutch plate 226. The top of the housing 212 serves as a bearing surface between the ferrule 204 and the head of a flat headed bolt 214 which pivotally connects the ferrule and clutch plate to the mounting bracket 16. Alternatively, the cup-shaped housing may be replaced by a flat washer having a diameter sufficient to captivate the ferrule 204. A washer 216 and nut 218 threaded on the bolt 214 on the opposite side of the mounting bracket 16 secures the cable assembly and spring clutch 21 to the mounting bracket 16. As is known in the art, the mounting bracket 16 need not be a separate part, but alternatively may be one of the risers of the seats frame as disclosed by Tamamushi in U.S. Pat. No. 4,451,087.

The guide finger 48 of the clutch plate 226 is received in an arcuate slot 220 formed in the mounting bracket or seat frame which limits the rotational displacement of the clutch plate 226 and the semi-rigid cable assembly 200. A clutch spring 28, identical to that used in the embodiment of FIGS. 1 and 2 is disposed between the clutch plate 226 and the mounting bracket 16 as previously described. In this embodiment, the spring clutch 21 also produces a frictional force to retain the cable assembly 200 and the attached buckle 10 in any position defined by the arcuate slot 220 in the mounting bracket or seat frame. A plastic sleeve (not shown) similar to plastic sleeve 24 shown in FIG. 1 may be used to cover the elongated anchor plate 112 or semi-rigid cable assembly 200 for aesthetic purposes but is not required to support the bucklet 10 as in the first described embodiment.

Having described the self-standing seat belt buckle mount, it is not intended that the invention be limited to the specific embodiment illustrated in the figures and described in the specification. It is acknowledged that one skilled in the art will be able to make structural changes without departing from the spirit of the invention as set forth in the appended claims.

What is claimed is:

1. In a self-standing seat belt buckle mount for a safety restraint system having a seat belt buckle mounted to one end of a semi-rigid member, a mounting bracket, and a pivot member pivotally connecting the mounting bracket with the other end of the semi-rigid member, wherein the improvement comprises:

a clutch plate connected to the other end of the semi-rigid member, said clutch plate having a spring engagement surface and an axial aperture circumscribing the pivot member; and a spring member compressively disposed between said clutch plate and the mounting bracket to produce a frictional force biasing said spring member into engagement with said spring engagement surface of said clutch plate for retaining the semi-rigid member in an adjustable self-standing position.

2. The improvement of claim 1 wherein said clutch plate is a molded structural plastic element.

3. The improvement of claim 1 having means for limiting the pivotal displacement of the semi-rigid member between predetermined angular positions.

4. The improvement of claim 3 wherein said means for limiting comprises:

an arcuate slot provided in said mounting bracket defining a predetermined angular interval; and a guide finger provided on said clutch plate received in said arcuate slot.

5. The improvement of claim 1 wherein said clutch plate has a concentric cylindrical rib defining said spring engagement surface and said spring member has a peripheral flat surface engaging said spring engagement surface and a plurality of spring fingers compressively engaging said mounting bracket.

6. The improvement of claim 1 wherein said clutch plate has a cylindrical collar circumscribing the pivot member and received in a mating aperture provided in the other end of the semi-rigid member, said cylindrical collar functioning as a bearing between the semi-rigid member and the pivot member.

7. The improvement of claim 1 wherein a key slot is provided at the other end of the semi-rigid member, said clutch plate has a key received in said key slot rotatably locking said clutch plate to the semi-rigid member.

8. The improvement of claim 6 wherein a key slot is provided at the other end of the semi-rigid member, said clutch plate has a key integral with said collar received in said key slot rotatably locking said clutch plate to the semi-rigid member.

9. In a self-standing seat belt buckle mount for a safety restraint system having a seat belt buckle mounted to one end of a semi-rigid member, a mounting bracket, and a pivot member pivotally connecting the mounting bracket with the other end of the semi-rigid member, wherein the improvement comprises:

a clutch plate connected to the mounting bracket, said clutch plate having an axial aperture circumscribing said pivot member and a spring engagement surface;

a spring member compressively disposed between said clutch plate and the other end of the semi-rigid member to produce a frictional force biasing said spring member into engagement with said spring engagement surface of said clutch plate.

10. The improvement of claim 9 wherein said clutch plate is a molded structural plastic element.

11. The improvement of claim 9 wherein said clutch plate has an integral collar circumscribing said pivot member, said integral collar received in an aperture provided in the mounting bracket concentric with the pivot member.

12. The improvement of claim 11 having means for limiting the pivotal displacement of the semi-rigid member through a predetermined angular interval.

13. The improvement of claim 12 wherein said means for limiting comprises:

an arcuate slot provided in the other end of the semi-rigid member defining said predetermined angular interval; and a guide finger provided on said clutch plate received in said arcuate slot.

14. The improvement of claim 9 wherein said clutch plate has a concentric cylindrical rib defining said spring engagement surface and said spring member has a peripheral flat surface engaging said spring engagement surface and a plurality of spring fingers engaging the other end of the semi-rigid member.

15. The improvement of claim 9 wherein a key slot is provided in the mounting bracket, said clutch has a key connecting said clutch plate to the mounting bracket.

16. The improvement of claim 15 having means for limiting the pivotal displacement of said semi-rigid member.

17. The improvement of claim 16 wherein said means for limiting comprises:

an arcuate slot provided in the other end of the semi-rigid member said arcuate slot defining a predetermined angular interval; and a guide finger provided on said clutch plate received in said arcuate slot.

18. The improvement of claim 9 wherein the mounting bracket is a a structural member of a seat associated with the safety restraint system.

19. A self-standing seat belt buckle mount for a vehicle safety restraint system comprising:

a seat belt buckle;

an elongated semi-rigid member connected at one end to said seat belt buckle;

a mounting bracket adapted to be attached to a structural member of the vehicle;

a pivot member pivotally connecting the other end of said semi-rigid member to said mounting bracket;

a clutch plate circumscribing said pivot member and connected to said semi-rigid member; and a washer type spring compressively disposed between said clutch plate and said mounting bracket, said washer type spring frictionally engaging said clutch plate for producing a frictional force retaining said semi-rigid member in an adjustable self-standing position.

20. The mount of claim 19 wherein said clutch plate has a cylindrical rib concentric with said pivot member defining a friction surface and wherein said washer type spring has a peripheral section engaging said friction surface and a plurality of spring fingers engaging said mounting bracket.

21. The mount of claim 19 wherein said semi-rigid member comprises:

an anchor plate pivotally connected to said mounting bracket by said pivot member;

a length of seat belt webbing connecting said seat belt buckle to said anchor plate; and a semi-rigid plastic sleeve encasing said anchor plate and said seat belt webbing providing structural support for the seat belt buckle.

22. The mount of claim 21 wherein said clutch plate has an integral key received in a mating key slot provided in said anchor plate to inhibit rotation of said clutch plate relative to said anchor plate.

23. The mounting bracket of claim 22 wherein said clutch plate has a cylindrical collar circumscribing said pivot means and received in an aperture provided in said anchor plate.

24. The mount of claim 23 wherein said key is integral with said cylindrical collar.

25. The mount of claim 21 having means for limiting the pivotal displacement of said anchor plate with respect to said mounting bracket.

26. The mount of claim 25 wherein said means for limiting comprises;

an arcuate slot provided in said mounting bracket; and a guide finger protruding from one edge of said clutch plate received in said arcuate slot.

27. The mount of claim 26 wherein said clutch plate has a connector pin disposed at the end of said guide finger received in a mating bore formed in said semi-rigid plastic sleeve to lock said plastic sleeve in a fixed position relative to said anchor plate.

28. The mount of claim 19 wherein said semi-rigid member is a loop of steel cable having one end of the loop connected to said seat belt buckle and the other end of the loop connected to said clutch plate.

29. The mount of claim 28 wherein said other end of said loop of steel cable is captivated by a ferrule defining a tear drop shaped aperture, said clutch plate has integral tear drop shaped collar received in the tear drop shaped aperture of said ferrule, and wherein said collar circumscribes said pivot member and functions as a bearing between said ferrule and said pivot member.

30. The mount of claim 28 having means for limiting the pivotal displacement of said clutch plate and the loop of steel cable with respect to said mounting bracket.

31. The mount of claim 30 wherein said means for limiting comprises:

an arcuate slot provided in said mounting bracket; and a guide finger protruding from one edge of said clutch plate received in said arcuate slot.

32. The mount of claim 31 wherein said mounting bracket is a vertical structural member of the seat associated with the self-standing seat belt buckle mount.

* * * * *